United States Patent
Gentilhomme et al.

(10) Patent No.: US 12,008,502 B2
(45) Date of Patent: *Jun. 11, 2024

(54) BUSINESS DESIGNER

(71) Applicant: Nintex USA, Inc., Bellevue, WA (US)

(72) Inventors: Alain Marie Patrice Gentilhomme, Sammamish, WA (US); Ryan Christopher Duguid, Sammamish, WA (US); Zoe Dee Clelland, Seattle, WA (US); Joshua Joo Hou Tan, Newport (AU)

(73) Assignee: Nintex USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,876

(22) Filed: May 1, 2023

(65) Prior Publication Data

US 2023/0267397 A1    Aug. 24, 2023

Related U.S. Application Data

(63) Continuation of application No. 17/367,128, filed on Jul. 2, 2021, now Pat. No. 11,640,568, which is a continuation of application No. 16/510,587, filed on Jul. 12, 2019, now Pat. No. 11,087,259.

(60) Provisional application No. 62/697,306, filed on Jul. 12, 2018.

(51) Int. Cl.
| G06Q 10/0633 | (2023.01) |
| G06F 3/04842 | (2022.01) |
| G06F 40/166 | (2020.01) |

(52) U.S. Cl.
CPC ..... *G06Q 10/0633* (2013.01); *G06F 3/04842* (2013.01); *G06F 40/166* (2020.01)

(58) Field of Classification Search
CPC ........ G06Q 10/00–50/00; G06F 1/00–2123/00
USPC ................................................ 705/7.11–7.42
See application file for complete search history.

(56) References Cited

U.S. PATENT DOCUMENTS

| 5,774,661 | A  | * | 6/1998 | Chatterjee | ............. | G06F 9/5038 |
| | | | | | | 709/238 |
| 7,403,948 | B2 | * | 7/2008 | Ghoneimy | ............. | G06Q 10/10 |
| | | | | | | 707/999.009 |
| 7,752,556 | B2 | * | 7/2010 | Forstall | ................ | G06F 3/0486 |
| | | | | | | 715/761 |
| 7,761,393 | B2 | * | 7/2010 | Macbeth | ................ | G06Q 10/10 |
| | | | | | | 709/205 |
| 8,024,670 | B1 | * | 9/2011 | Rahmatian | ........... | G06Q 40/125 |
| | | | | | | 705/320 |

(Continued)

*Primary Examiner* — Alan S Miller
(74) *Attorney, Agent, or Firm* — Perkins Coie LLP

(57) ABSTRACT

The present disclosure provides systems and methods for a synergetic, multi-interface workflow designer: a visual tool that enables the design, building, and use of high-level processes and standard-configuration workflows among multiple users with varying technical capabilities on multiple systems. For example, it enables a line of business user to design and create a high-level process on a first designer interface. The process and its data are received by a second designer interface, which translates the process and data into a standard-configuration workflow. A workflow designer may access the second designer interface to create, refine, and finalize the standard-configuration workflow based on the data from the first designer interface.

20 Claims, 10 Drawing Sheets

(56) References Cited

U.S. PATENT DOCUMENTS

| | | | | |
|---|---|---|---|---|
| 8,140,373 B2* | 3/2012 | Aron | | G06Q 10/0633 |
| | | | | 705/7.27 |
| 8,170,901 B2* | 5/2012 | Shukla | | G06Q 10/0633 |
| | | | | 705/7.12 |
| 8,346,716 B2* | 1/2013 | Watanabe | | G06Q 10/06 |
| | | | | 707/608 |
| 8,656,346 B2* | 2/2014 | Kodi | | G06F 9/45512 |
| | | | | 717/106 |
| 8,745,634 B2* | 6/2014 | Agarwal | | G06Q 10/0633 |
| | | | | 705/7.13 |
| 8,863,107 B2* | 10/2014 | Krivopaltsev | | H04L 41/20 |
| | | | | 717/173 |
| 8,930,833 B2* | 1/2015 | Levin | | G06Q 10/00 |
| | | | | 717/113 |
| 8,984,046 B2* | 3/2015 | Dhoolia | | G06F 9/50 |
| | | | | 709/224 |
| 9,311,134 B1* | 4/2016 | Bostick | | G06F 3/167 |
| 9,395,959 B2* | 7/2016 | Hatfield | | G06Q 10/06 |
| 9,466,048 B2* | 10/2016 | Liggett | | G06F 40/166 |
| 9,672,497 B1* | 6/2017 | Lewis | | G06F 40/284 |
| 2002/0078432 A1* | 6/2002 | Charisius | | G06Q 10/0633 |
| | | | | 717/102 |
| 2002/0128890 A1* | 9/2002 | Dick | | G06Q 10/06 |
| | | | | 705/7.26 |
| 2002/0138543 A1* | 9/2002 | Teng | | G06Q 10/06 |
| | | | | 707/E17.005 |
| 2002/0188597 A1* | 12/2002 | Kern | | G06Q 30/06 |
| 2003/0004770 A1* | 1/2003 | Miller | | G06Q 10/10 |
| | | | | 717/102 |
| 2003/0004771 A1* | 1/2003 | Yaung | | G06F 9/4488 |
| | | | | 717/102 |
| 2003/0005406 A1* | 1/2003 | Lin | | G06Q 10/10 |
| | | | | 717/102 |
| 2003/0018512 A1* | 1/2003 | Dortmans | | G06Q 10/10 |
| | | | | 718/100 |
| 2003/0083915 A1* | 5/2003 | Guicciardi | | G06Q 10/0633 |
| | | | | 705/7.27 |
| 2004/0078373 A1* | 4/2004 | Ghoneimy | | G06Q 10/10 |
| 2004/0128001 A1* | 7/2004 | Levin | | G05B 17/02 |
| | | | | 700/31 |
| 2005/0262112 A1* | 11/2005 | Moore | | G06Q 10/06 |
| 2006/0005140 A1* | 1/2006 | Crew | | G06Q 10/06 |
| | | | | 715/760 |
| 2006/0053380 A1* | 3/2006 | Spataro | | G06Q 10/10 |
| | | | | 709/204 |
| 2006/0074730 A1* | 4/2006 | Shukla | | G06Q 10/0633 |
| | | | | 705/7.26 |
| 2006/0074731 A1* | 4/2006 | Green | | G06Q 10/06316 |
| | | | | 705/7.27 |
| 2006/0074732 A1* | 4/2006 | Shukla | | G06Q 10/06 |
| | | | | 717/106 |
| 2006/0074735 A1* | 4/2006 | Shukla | | G06F 8/34 |
| | | | | 705/80 |
| 2006/0080616 A1* | 4/2006 | Vogel | | G06F 9/451 |
| | | | | 715/769 |
| 2006/0085245 A1* | 4/2006 | Takatsuka | | G06Q 10/10 |
| | | | | 705/7.12 |
| 2006/0112122 A1* | 5/2006 | Goldszmidt | | G06Q 10/06 |
| 2006/0229924 A1* | 10/2006 | Aron | | G06Q 10/06316 |
| | | | | 705/7.26 |
| 2006/0241997 A1* | 10/2006 | Bhatawdekar | | G06Q 10/06 |
| | | | | 705/7.17 |
| 2007/0006123 A1* | 1/2007 | Matsui | | G06Q 10/06 |
| | | | | 717/100 |
| 2007/0061695 A1* | 3/2007 | Sanabria | | G06Q 40/04 |
| | | | | 715/273 |
| 2007/0136117 A1* | 6/2007 | Matsueda | | G06Q 10/06 |
| | | | | 358/1.15 |
| 2007/0226680 A1* | 9/2007 | Kumhyr | | G06Q 10/10 |
| | | | | 717/102 |
| 2007/0266093 A1* | 11/2007 | Forstall | | G06F 9/451 |
| | | | | 715/764 |
| 2007/0276714 A1* | 11/2007 | Beringer | | G06Q 10/10 |
| | | | | 705/7.12 |
| 2008/0147453 A1* | 6/2008 | Kogan | | G06Q 10/06 |
| | | | | 705/7.26 |
| 2008/0221917 A1* | 9/2008 | Boyette | | G06Q 10/06 |
| | | | | 705/1.1 |
| 2008/0229307 A1* | 9/2008 | Maeda | | G06F 9/5038 |
| | | | | 718/100 |
| 2008/0235057 A1* | 9/2008 | Weidenhaupt | | G16H 50/20 |
| | | | | 705/3 |
| 2008/0307490 A1* | 12/2008 | Van Wyk | | G06Q 10/06 |
| | | | | 726/1 |
| 2009/0070162 A1* | 3/2009 | Leonelli | | G06Q 10/06 |
| | | | | 705/7.27 |
| 2009/0204467 A1* | 8/2009 | Rubio | | G06Q 10/0631 |
| | | | | 705/7.27 |
| 2009/0282067 A1* | 11/2009 | Bendigeri | | G05B 19/042 |
| | | | | 717/136 |
| 2010/0242013 A1* | 9/2010 | Hao | | G06Q 10/10 |
| | | | | 717/102 |
| 2011/0239183 A1* | 9/2011 | Paradkar | | G06F 8/10 |
| | | | | 717/104 |
| 2011/0307856 A1* | 12/2011 | Klaka | | G06Q 10/06 |
| | | | | 717/104 |
| 2013/0085798 A1* | 4/2013 | Spatola | | G16H 40/20 |
| | | | | 705/7.12 |
| 2013/0179208 A1* | 7/2013 | Chung | | G06Q 10/06 |
| | | | | 705/7.15 |
| 2014/0229227 A1* | 8/2014 | Peed | | G06F 8/34 |
| | | | | 705/7.27 |
| 2014/0372965 A1* | 12/2014 | Alibakhsh | | G06Q 10/103 |
| | | | | 717/101 |
| 2015/0088592 A1* | 3/2015 | Marin | | G06Q 10/06316 |
| | | | | 705/7.27 |
| 2015/0089021 A1* | 3/2015 | Bergbauer | | H04L 67/1097 |
| | | | | 709/217 |
| 2017/0147296 A1* | 5/2017 | Kumar | | G06Q 10/06 |

* cited by examiner

BUSINESS DESIGNER

CROSS-REFERENCE TO RELATED APPLICATIONS

This application claims benefit to U.S. Non-Provisional application Ser. No. 17/367,128 filed on Jul. 2, 2021, and titled Business Designer, which in turn claims priority to U.S. Non-Provisional application Ser. No. 16/510,587 filed on Jul. 12, 2019, titled Business Designer, and U.S. Provisional App. No. 62/697,306, filed on Jul. 12, 2018, and titled Business Designer, the contents all of which are incorporated by reference herein as though set forth in their entirety and to which priority and benefit are claimed.

TECHNICAL FIELD

The present disclosure relates generally to the field of customized workflow processes. More specifically, the present disclosure relates to enhanced systems, methods, and processes for a collaborative, visual programming tool that enables, among multiple users with varied technical capabilities, the electronic translation of a high-level process into a standard-configuration workflow. Embodiments of this disclosure provide systems, methods, and processes that improve the efficient use of a computer system, including collaborative development of systems that improve the efficiency of all computer processes, the cloud, and the Internet in general.

BACKGROUND

Programmatic Workflows are applications and systems that streamline and automate a wide variety of processes, such as collecting signatures, gathering feedback, requesting approvals for a plan or document, or tracking the current status of a business procedure. Workflows can be created on low-code development platforms, or via full code implementations, enabling a user to automate many processes in a way that dramatically enhances productivity and efficiency in any industry.

However, for a workflow to be effective, its substance must be tailored to the individual needs of its owner. Yet programmatic workflows are often generic in form and function and tend to be cumbersome to use. Accordingly, for a workflow to be customized in an efficient and conservative manner, it requires a system and method that: (i) receives substantive data in the form of a high-level process from the workflow owner and (ii) translates the substantive data and high-level process into a standard-configuration workflow. Currently, this demands time, talent, and high costs, because the design and creation of the workflow requires technical professionals to do the manual labor of creating, editing, or improving workflows.

Furthermore, the current functionality and representation of these workflows and processes is quite static and tends to inhibit the insights available and limit the types of people who can benefit from these insights. In addition, the owner responsible for determining the high-level process and providing its substance is often limited in effectively setting the core goals and success criteria for a given workflow. This often results in mismatched expectations between the workflow owner and the technical professional designing the workflow, as well as forced use of multiple tools and lowered satisfaction in or efficacy of the process.

Thus, what is needed are systems and methods that provide a tool for: (i) translating the data and high-level process received from a workflow owner into a standard-configuration workflow and (ii) communication between the workflow owner and the workflow technical professional responsible for the design, creation, and revision of the workflow.

SUMMARY

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems and methods for a synergetic, multi-interface workflow designer ("Designer"), a collaborative, visual tool that enables the design, building, and use of high-level processes and standard-configuration workflows among multiple users with varying technical capabilities on multiple systems. This enables a line of business user, such as a workflow owner, to design and create a high-level process on a first designer interface. The process and its data are then received, translated into a standard-configuration workflow, and displayed on a second designer interface. A technical professional may access the second designer interface to develop, refine, and finalize the workflow based on the data from the first designer interface.

For example, the Designer may have at least two browser-based design interfaces, with each designer interface comprising a canvas and accompanying features for the creation and alteration of either high-level processes or standard-configuration workflows. In one embodiment, the first interface may receive inputted data that will eventually make up the workflow. The inputted data may be organized in a high-level process via one or more methods. One method for organizing may be in blocks and sub-blocks, with a block making up an activity or action, and the sub-block(s) making up tasks or sub-actions within the activity or action. The blocks may be consecutively connected to each other, to reflect the flow of the process, or the blocks may be organized to reflect the flow of a decision tree. Another organization method may be an outline format, with numbering or indentation to reflect activities and the tasks that make up the activities.

The second interface may receive the organized inputted data and/or high-level process from the first interface and map the activities and tasks into workflow actions. The second interface may do this via natural language processing. The second interface may also receive and map the data via other processes, such as machine learning or pre-determined settings, which either have the intelligence or are preset to know where workflows may be commonly used or what the actions to be mapped most likely are. Once the mappings are confirmed, the second interface may generate a workflow with the mapped activities and tasks. The activities may appear as action sets and the tasks may appear as mapped actions. The second interface may further comprise options for editing, overlay of information onto the workflow or high-level process, and for the expansion and compression of various levels of the workflow or process.

Thus, a preferred embodiment of the Designer allows for the creation of a high-level process by the line of business user that is then configured into a standard-configuration workflow that can be modified and prepared for publication. The preferred embodiment of the Designer further implements a number of features, such as the overlay of data or expansion/compression of various levels, previously unknown in the industry. The overlay of data and expansion/compression may be synced between the line of business user (i.e. workflow owner) and the workflow designer. The capability of creating a high-level process that is then configured and rendered into a standard-configuration workflow, and the implementation of the aforementioned features, together with the ease of use regardless of users' technical capabilities, provides a major enhancement over existing workflow technologies. These advantages serve as improvements over existing workflow solutions by enhancing the power of creating workflows through collaboration and sharing across various users and through enhanced remote access.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Before the present methods and systems are disclosed and described, it is to be understood that the systems and methods are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1A:
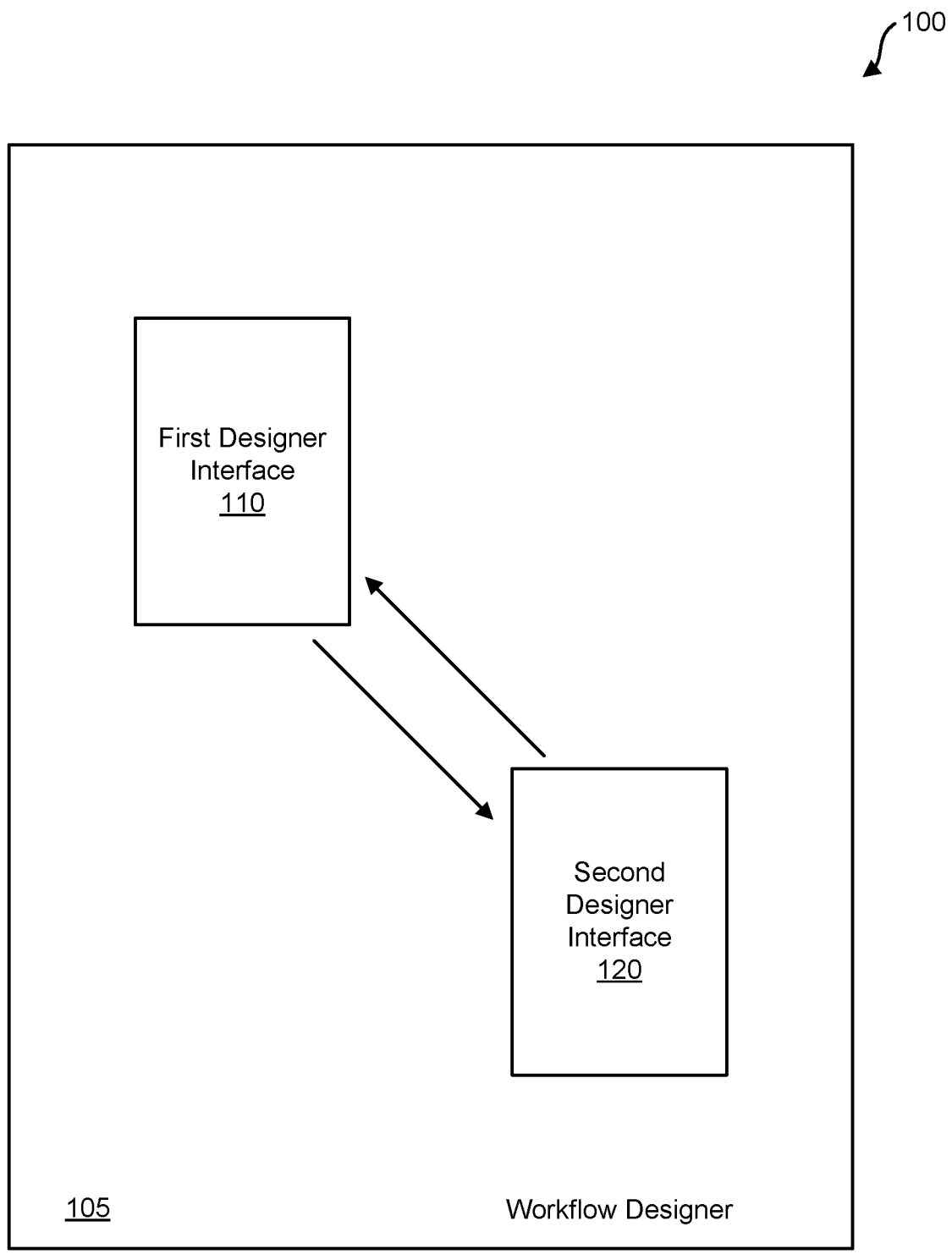
FIG. 1A illustrates an example overview of one or more implementations described herein.

FIG. 1A illustrates an example overview 100 of one or more implementations described herein. As shown in FIG. 1A, a synergetic, multi-interface workflow designer ("Designer") 105 may include a first designer interface 110 and a second designer interface 120.

The first interface 110 may be a graphical user interface that can allow one or more users to interact with an electronic device through graphical icons and visual indicators to create and/or change the layout of one or more high-level process. The first interface 110 may receive data input from a user. After receiving data input from the user, the first interface 110 may configure the data input into a map of a high-level process. The first interface 110 may communicate with the second interface 120 to send the data and high-level processes to it and to also receive data from it. A high-level process may be a workflow process created by a user, generally a line of business user. The high-level process may be the least granular representation of a workflow and is most suited for a non-technical user. The first designer interface allows a user to create a high-level process without complexity or technical roadblocks. The high-level process may then be configured and rendered into a standard-configuration workflow on the second interface 120. A standard-configuration workflow may be more technical and may be most commonly used by a workflow professional.

The second interface 120 may be a graphical user interface that can allow one or more users to interact with an electronic device through graphical icons and visual indicators to create and/or change a workflow. The second interface 120 may receive the data and processes from the first interface 110 to translate into, create, and/or edit a workflow. The second interface 120 may also publish the workflow and provide data of the published workflow to the first interface 110. The users of the first interface 110 and the second interface 120 may communicate with each other via the communication functionalities of the Designer 105. For example, once the standard-configuration workflow is generated on the second interface 120 and published, the workflow owner may be notified, confirm updates, and republish the workflow.

Figure 1B:
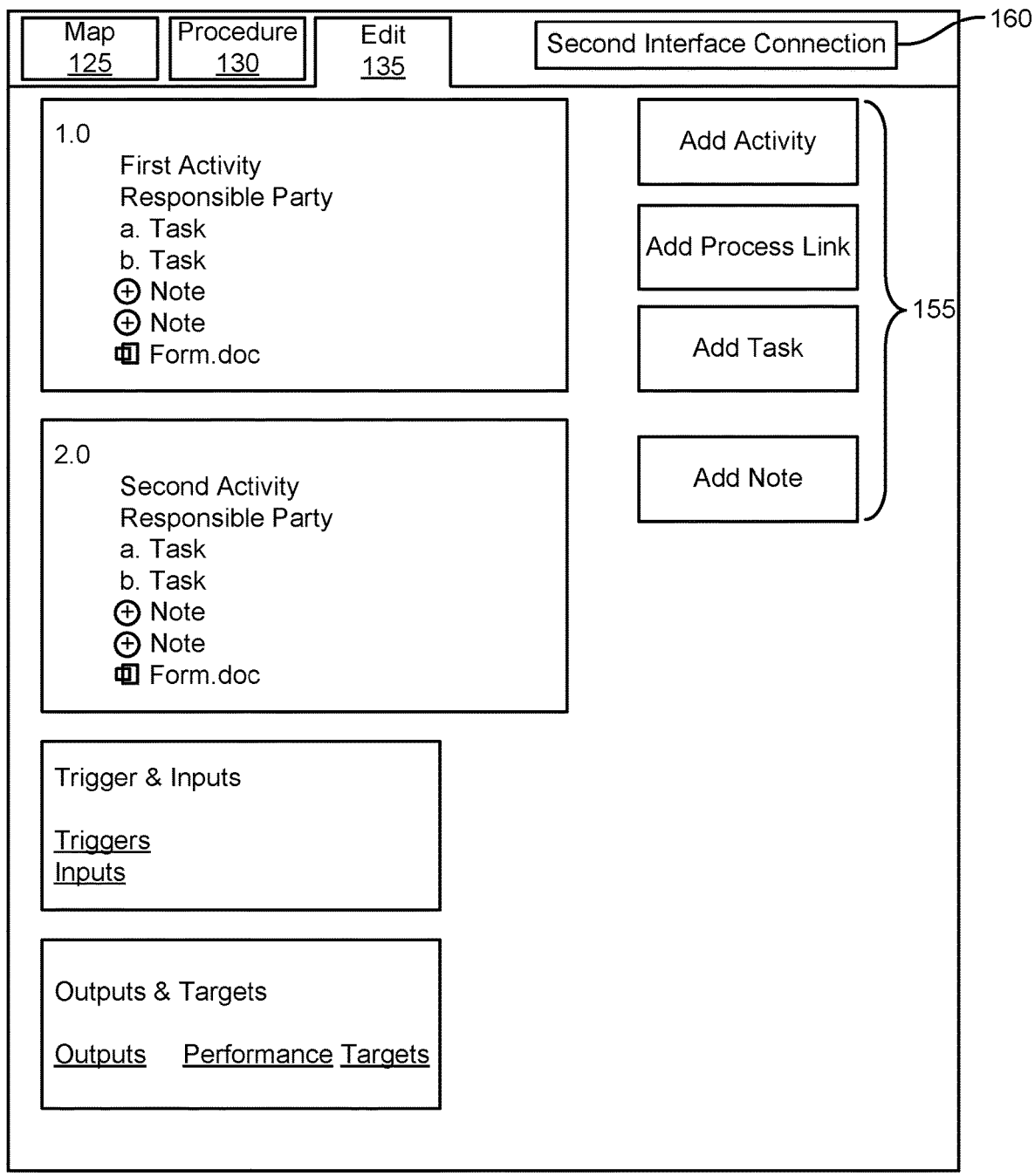
FIG. 1B is a block diagram generally illustrating an embodiment of a canvas of a first designer interface of a workflow designer system.

FIG. 1B is a block diagram generally illustrating an embodiment of a canvas of a first designer interface of a workflow designer system. As shown in FIG. 1B, the first interface 110 may include the options to map 125, display a procedure 130, and edit 135 a high-level process. The edit 135 option may allow a user to create and edit a process. The first interface 110 may include building tools 155 (such as the option to add an activity block, a process link, a task, and a note) and communication capabilities 160 with the second interface 120. The communication capabilities 160 may allow the first interface 110 to transfer the data to the second interface 120, such that the second interface 120 may create, generate, and display a workflow based on the data received.

For example, upon receiving data input from the user, the first designer 110 may create and display a process—based on the user input—that includes a first activity, a second activity, triggers or inputs, and outputs or targets. Any of the activity, such as the first and second activity, may include user-designation of the party responsible for completing the activity. The activity may also include user-inputted tasks within the activity that must be accomplished before the activity is completed. Additionally, the activities may include user-inputted notes or documents attached to the activities. These notes and documents may be viewed and/or accessed by other users or by the party responsible for completing the activity or task and may aid in the completion of the activity or task.

Figure 1C:
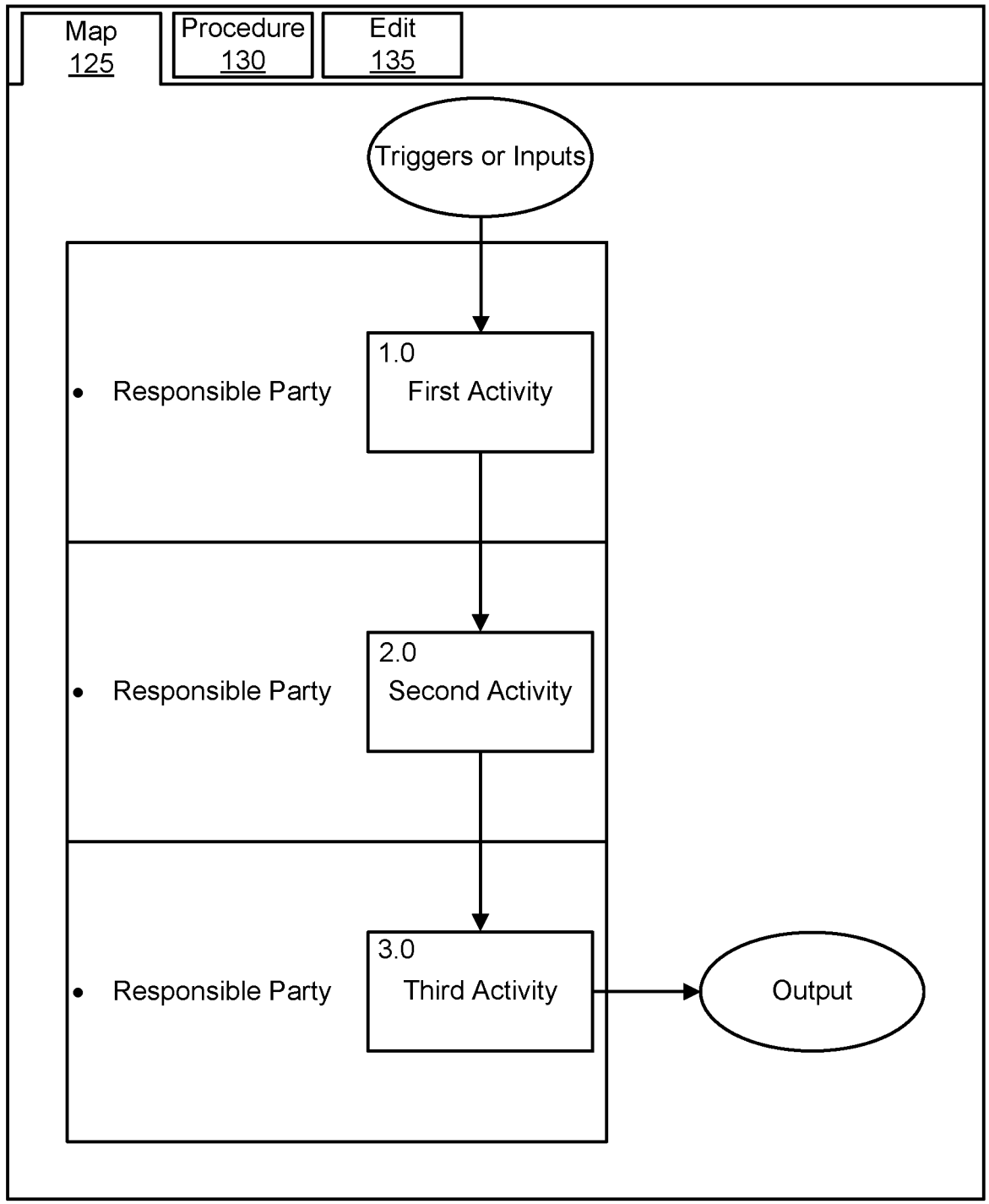
FIG. 1C is a block diagram generally illustrating an embodiment of a canvas of a first designer interface of a workflow designer system.

FIG. 1C is a block diagram generally illustrating an embodiment of a canvas of a first designer interface of a workflow designer system. As shown in FIG. 1C, the first interface may provide the option to map 125 a high-level process created by a user. The map 125 option may receive the process data from the display 130 and edit 135 options to create, generate, and display a high-level map of the process. The high-level map may be a rendition of the process data that displays the activities, such as the first and second activities in FIG. 1B, along with the responsible party for the activity. The high-level map may display tasks, triggers or inputs, and outputs or targets.

In an embodiment, the first interface 110 may provide a high-level process selection option, under the display 130 or edit 135 option, that the user may use to select an existing high-level process template. An existing high-level process template may comprise one or more pre-selected activities, one or more pre-selected tasks within the one or more pre-selected activities, and any other process links or notes that make up the building tools 155. The user may use the existing high-level process template directly or change the existing high-level process template by adding or removing activities or using the building tools 155.

In another embodiment, the user may use the first interface 110 to create a workflow by using a high-level process selection option to select a new high-level process. A user may select a building tool 155 option and add it to the high-level process. In another embodiment, the user may use a building tool 155 to modify an existing high-level process by selecting an existing high-level process currently in use.

In other embodiments, a high-level process displayed on the first interface 110 may have embedded data outlining the date and time of its inception and any or all date and times of changes to either the structure of the process or completion of the process. This data may be obtained with a tracking log for any type of high-level process or standard-configuration workflow, regardless of whether it was created by a user or a template.

In another example, the creation of a high-level process method 500 may include two or more users with separate electronic devices designing a single high-level process in conjunction with other each other. The high-level process being designed in conjunction by two or more users may be accessible to only the users designing the high-level process or may be accessible to other users.

The workflow generated by the second interface 120 may be based on the data inputted into the first interface 110 and be more technical when compared to the high-level process on the first interface 110. When used in reference to a workflow, "standard configuration" may be defined as an underlying structure that enables data to be organized into, and function as, a workflow. A "standard-configuration workflow" may be defined as a functioning workflow. The Designer 105 may convert received data into a standard-configuration workflow by a process known as "translating" or "rendering." For example, the second interface 120 may receive the high-level process data from the first interface 110, determine a standard configuration for the high-level process, render the workflow according to the determined standard configuration, and generate the rendered workflow onto the graphical display 205 of the second interface 120.

In another example, the second interface 120 may use natural language processing technology, when creating a workflow, to coordinate the coupling of activities and tasks from the high-level process in the first interface 110.

Figure 2A:
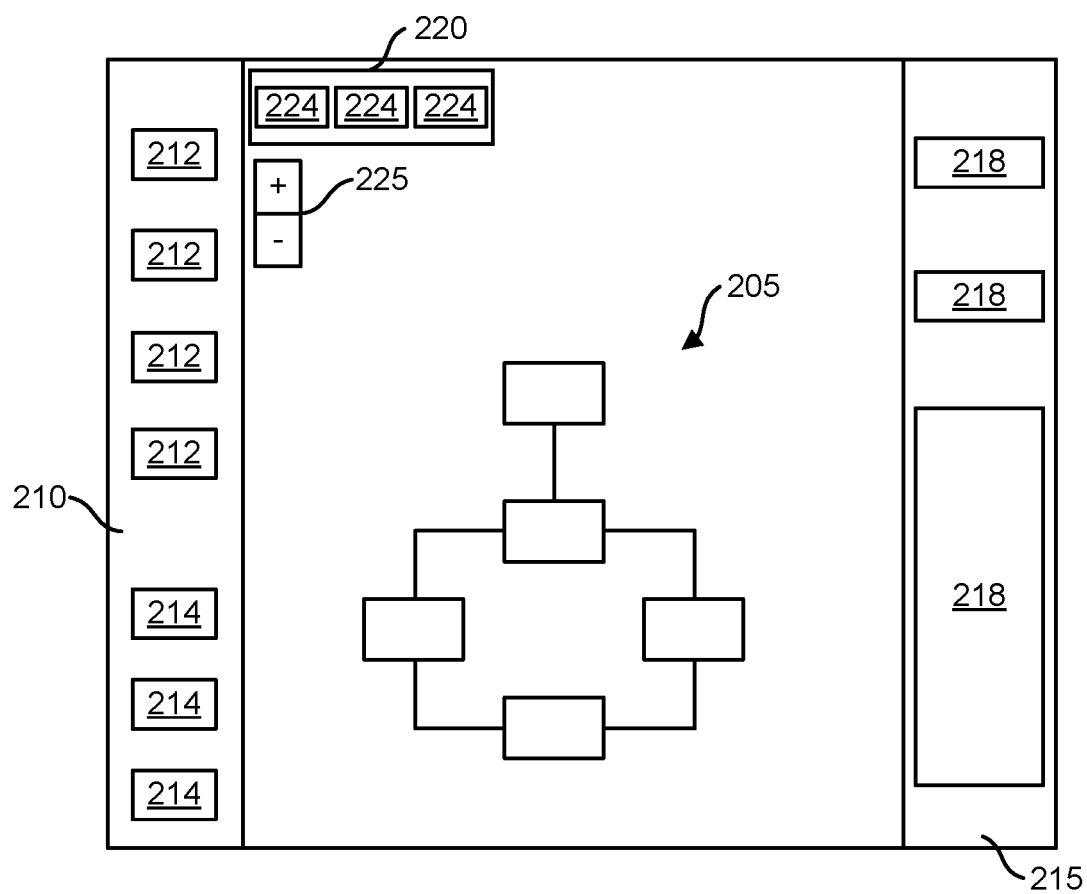
FIG. 2A is a block diagram generally illustrating an embodiment of a canvas of a second designer interface of a workflow designer system.

FIG. 2A is a block diagram generally illustrating an embodiment of a canvas of a second designer interface of a workflow designer system. As shown in FIG. 2A, the second interface 120 may comprise a graphical display canvas 205, a toolbox 210, a descriptions instrument 215, a second interface toggle menu 220, zoom features 225. The canvas 205 may be used to display a workflow generated by the Designer.

The second designer interface 120, in a basic embodiment, may be a graphical user interface that can allow one or more users to interact with an electronic device through graphical icons and visual indicators to create and/or change the design of one or more standard-configuration workflows. In embodiments, the graphical display canvas 205 may be a visual drawing board that a user can engage with in creating and/or changing the structure of the standard-configuration workflow. A toolbox 210 may comprise one or more tools 212 or one or more applications 214. The descriptions instrument 215 may comprise one or more entry fields 218 wherein a user can input additional data related to any of the workflow actions, tools 212, or applications 214 that make up the standard-configuration workflow. For example, data inputted into the entry fields 218 may comprise necessary information to send an email, detailed directions for a step, or directions for an application that another user may consider when using the application.

Tools 212 may comprise various options that can be used to create and change the standard-configuration workflow or can be inserted into the workflow. Tools 212 may comprise Communication options, such as an Express Approval option, a Send an Email option, an Assign a Task option, a Get Info From option, a Put Info In option, a Put Info In option, a Manage a File option, a Make a Decision option, a Add a Comment option, or a Request Approval option. Communication options may serve as steps, or basic building blocks of a standard-configuration workflow. Tools 212 may also comprise Logic and Flow options, which can be inserted into the workflow to define the relationship between various steps of the workflow or to connect various steps. Logic and Flow options may comprise, among other options, an either/or option, a yes/no option, a reject/approve option, or a tree branch option. Tools 212 may further comprise Operations options, such as an Express Approval option, a Notification option, or an Invitation to Edit option. Operations options may also serve as steps, or building blocks, of the workflow. Tools 212 may further comprise Integration options, which can serve to integrate with one or more other applications 214, high-level processes, standard-configuration workflows, or other electronic devices.

Additionally, tools 212 may comprise a tracking log, the tracking log comprising embedded data related to history of a high-level process or standard-configuration workflow currently present in the graphical display canvas 205. The tracking log data may comprise inception date and time of a workflow, date and time of all amendments, users participating in the workflow, users who have viewed or are viewing the workflow, activity stream, and other data related to the use of the workflow by one or more users.

Applications 214 may comprise one or more computer programs designed to perform a group of coordinated functions and can be used to create and change the workflow or be inserted into the workflow. Examples of applications 214 may comprise Office 365™ services, Salesforce™ services, Dropbox™ services, and other services that may benefit users. Similarly, an example of an Application 214 may have the functionality to receive a high-level process or standard-configuration workflow from a third-party system and translate it, via the Designer, into a standard-configuration workflow that is compatible with the Designer's interfaces. Applications 214 may serve as actions in the workflow, be integrated within an option found in tools 212, or be connected to an option found in tools 212. The descriptions instrument 215 may comprise one or more entry fields 218 wherein a user can input additional data related to any of the actions, tools 212, or applications 214 that make up the workflow. Data inputted into the entry fields 218 may comprise necessary information to send an email, detailed directions for a step, or directions for an application that another user may consider when using the application.

A designer interface toggle menu 220 may comprise one or more second interface toggle options 224 that may be used to toggle between a standard-configuration workflow and an evaluation configuration workflow. A zoom feature 225 may comprise one or more options to zoom in or out of the standard-configuration workflow that is being displayed in the graphical display canvas 205. A zoom feature 225 may be displayed in various ways, such as a plus-or-minus option, or a display of a linear spectrum of the expansion and compression of the displayed workflow.

The second interface 120 may allow a user to modify, revise, or refine the standard-configuration workflow, and prepare the standard-configuration workflow for publication and use. A user may further use the second interface 120 to build a standard-configuration workflow that captures the key requirements of the high-level process. In one embodiment, the user may use the second interface 120 to modify a standard-configuration workflow by dragging and dropping any combination of tool 212 options and applications 214. The user may also select a combination of tool 212 options, such as Logic and Flow options, to define the relationship between the standard-configuration workflow and the added tool and/or application.

In other embodiments, a standard-configuration workflow displayed on the graphical display canvas 205 may have embedded data outlining the date and time of its inception and any or all date and times of changes to either the structure of the workflow or completion of the workflow. This data may be obtained with a tracking log for any type of high-level process or standard-configuration workflow, regardless of whether it was created by a user or a template.

In another embodiment, a user can edit the generated workflow on the second interface and then have the edits be seen on the first interface as a high-level process. When used in reference to a high-level process, a "process configuration" may be defined as an underlying structure that enables data to be organized into, and function as, a high-level process. The Designer 105 may convert received data into a process configuration by a process known as "translating" or "rendering." For example, the Designer is further comprised to receive the user data input modifying the standard-configuration workflow, determine a process configuration for translating the received user data input, translate the received data into a process configuration according to the determined process configuration, and generate the process configuration onto the second interface 120. In other embodiments, the Designer may automatically update and/or sync the first interface 110 with modifications to the respective workflow in the second interface 120. For example, upon changes being made to the workflow in the second interface 120, the Designer may update either the corresponding high-level process in the first interface 110 or transmit the revised workflow directly to the first interface 110. The Designer may further be comprised to automatically update and/or sync the second interface 120 with modifications to the first interface 110.

Figure 2B:
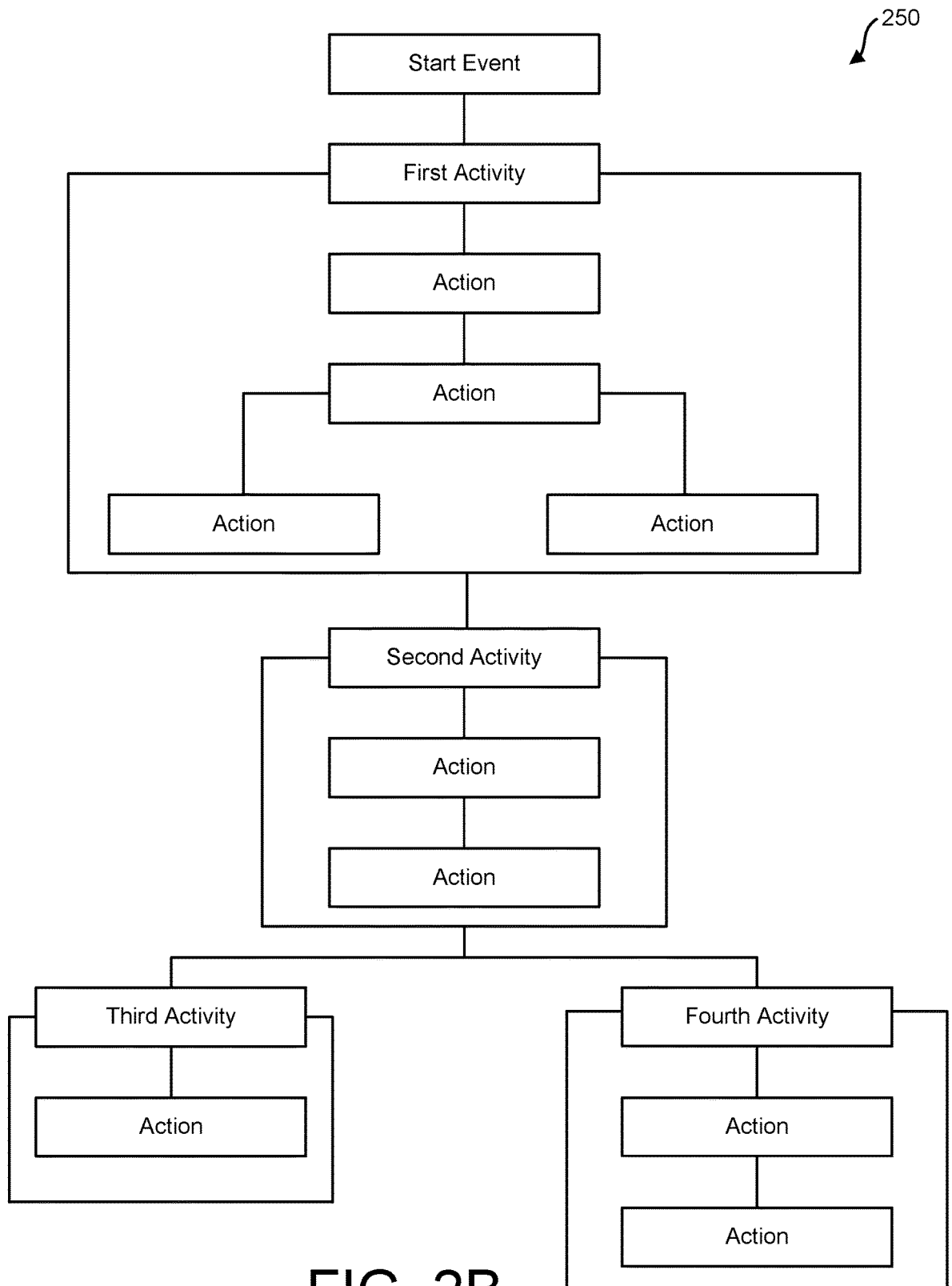
FIG. 2B is a block diagram generally illustrating an embodiment of a workflow generated by the second designer interface of a workflow designer system.

FIG. 2B is a block diagram generally illustrating an embodiment of a workflow 250 generated by the second designer interface of a workflow designer system. As generally shown in FIG. 2B, the workflow 250 generated by the second interface 120 may include a start function, activity functions, action functions, and a stop function. For example, the workflow 250 may contain the first, second, and third activities and tasks from the high-level processes found in FIGS. 1B and/or 1C and translate them, respectively, into high-level activities and action. In other words, an activity in the first interface 110 is mapped into an activity (also called an "action set") in the workflow on the second interface 120 and a task in the first interface 110 is mapped into an action in the workflow on the second interface 120.

Figure 3:
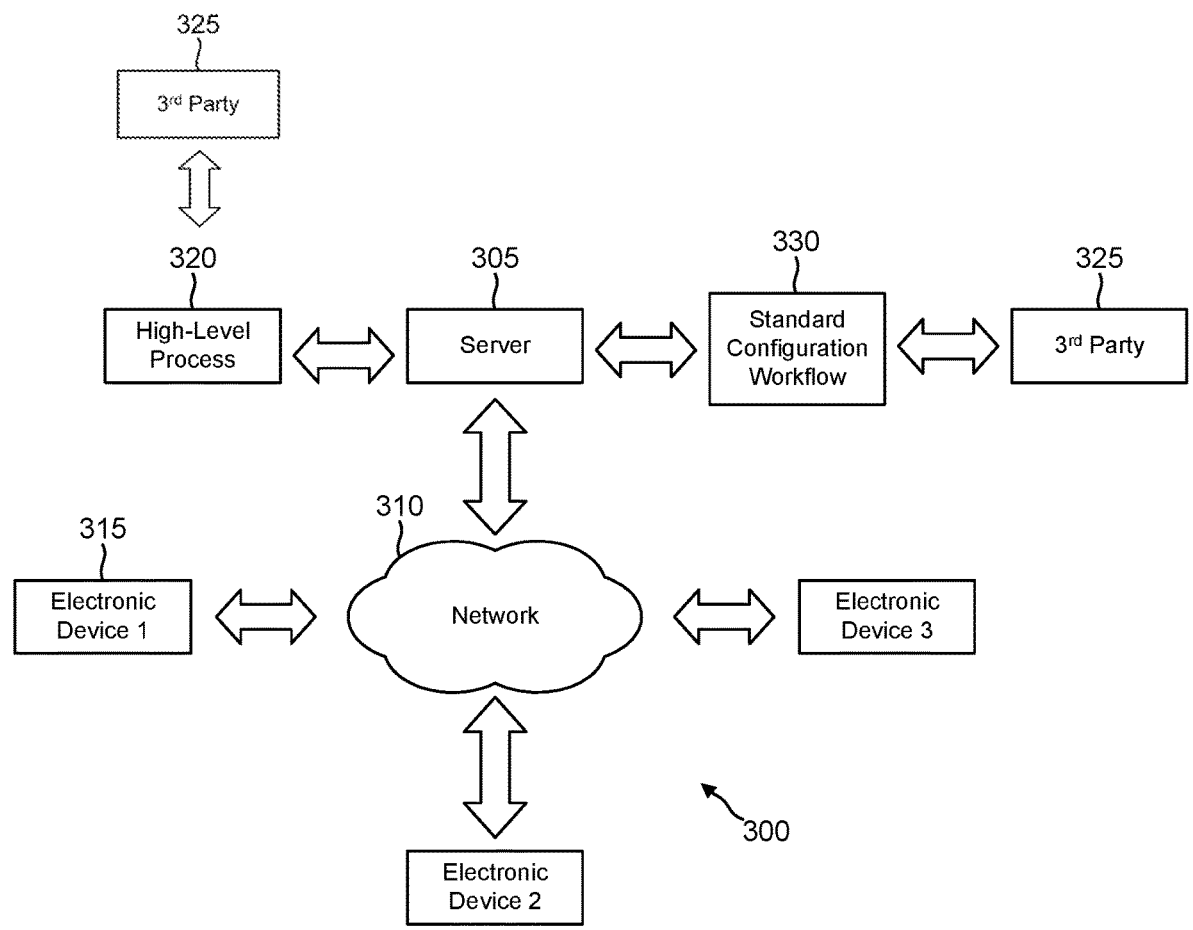
FIG. 3 is a functional block diagram generally illustrating an embodiment of a network system of a workflow designer system.

FIG. 3 is a functional block diagram generally illustrating an embodiment of a network system 300 of a synergetic multi-interface workflow designer system. Shown in FIG. 3 is a workflow server 305 accessible over a local area networks or a wide area network 310, such as the Internet, by one or more user electronic devices 315 (e.g., electronic device 2, electronic device 3). As illustrated, the workflow server 305 hosts one or more high-level processes 320 or one or more standard-configuration workflows 330 each accessible to their respective owners and other users. In accordance with the preferred embodiment, the workflow server 305 is remotely accessible by a number of user computing devices 315, including for example, laptops, smartphones, computers, tablets, and other computing devices that are able to access the local area network or a wide area network where the workflow server 305 resides. In normal operation, each user electronic device 315 connects with the workflow server 305 to interact with the first designer interface 110, the second designer interface 120, one or more high-level processes, and one or more standard-configuration workflows. As is also known, each high-level process and standard-configuration workflow may employ a number of connectors to interact with third party 325 data, services, or applications, for example, third party data or services like Salesforce™, Facebook™ Twitter™, various cloud services, or any other data or service accessible through a network, including local area networks (for example a local application that is exposed as a WebService residing on-premises) or wide area networks (for example the Internet). In one example, an email connector may be used to send a predefined email as part of a workflow. In another example, a CRM connector may be used to issue a query to a customer relationship management cloud service that hosts important data for the customer. These and many other examples will be apparent to those skilled in the art. For the purpose of this discussion, each user electronic device 315 may take the form of computer software and hardware deployed in a local computing environment or perhaps in a remote hosted computing environment. Each user computing device may host or access its own workflows, perhaps executing on the user's own premises. However, in accordance with the most preferred embodiment, a number of user electronic devices 315 may interact with the workflow server 305 to manage the user workflows remotely hosted at the workflow server 305. The features enabled by the interaction of user electronic devices 315 and the workflow server 305 include, but are not limited to, the ability to embed, reuse, and share workflows among a plurality of users and the ability to externally execute one or more shared workflows.

Figure 4:
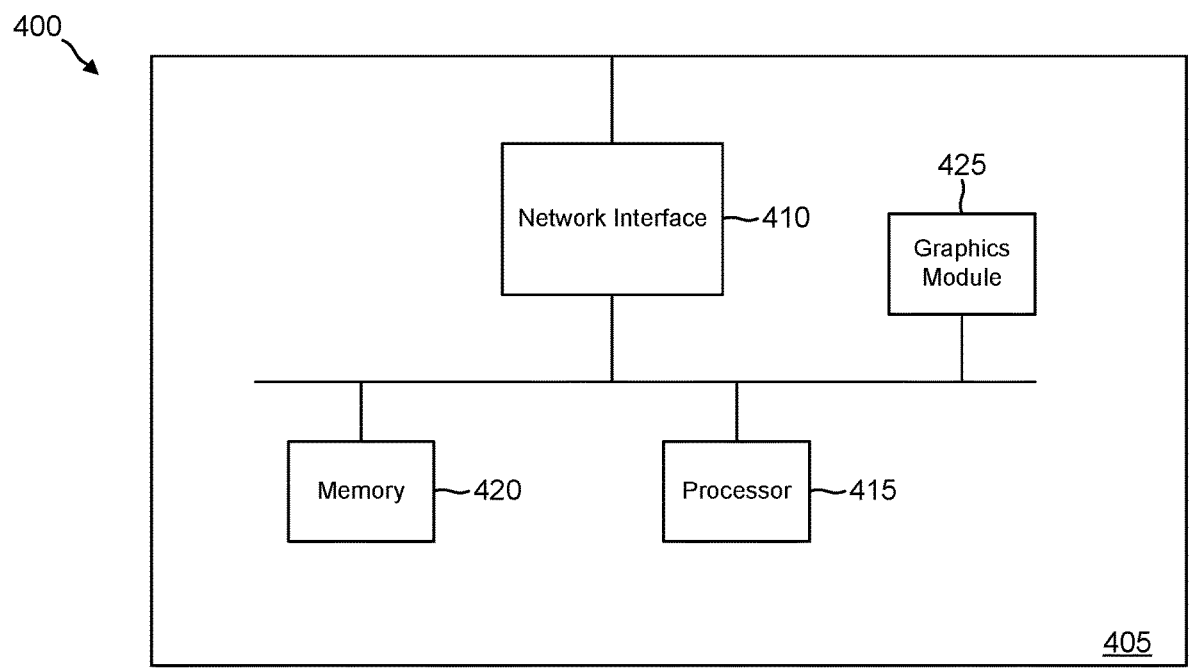
FIG. 4 is a functional block diagram generally illustrating an embodiment of an electronic device system of a workflow designer system.

FIG. 4 is a functional block diagram generally illustrating an embodiment of an electronic device system 400 of a synergetic multi-interface workflow designer system. The electronic device 405 may be coupled to the workflow server 310 via a network interface 410 and a network 305. The electronic device 405 generally comprises a processor 415, a memory 420, and a graphics module 425. The electronic device 405 is not limited to any particular configuration or system.

Figure 5:
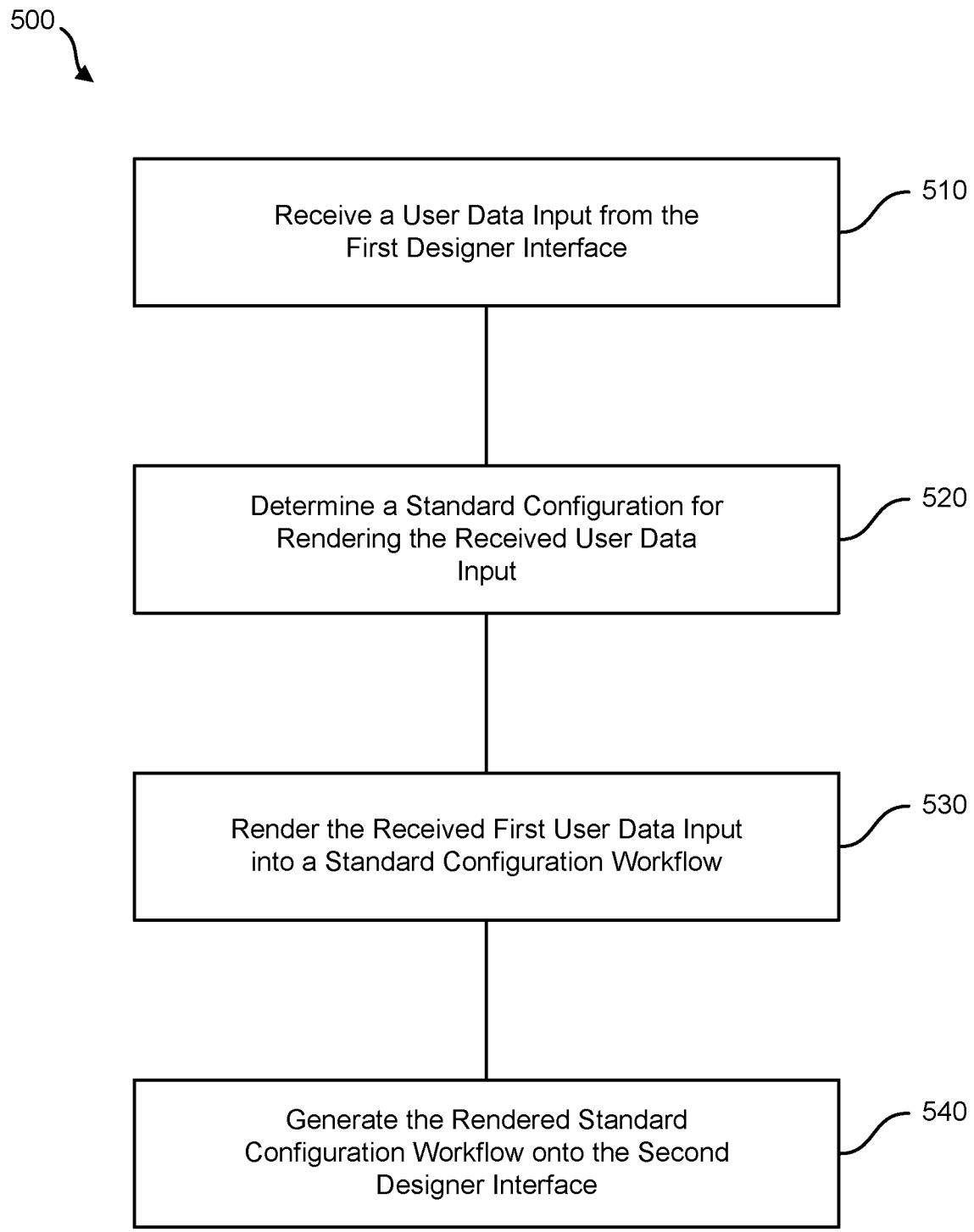
FIG. 5 is a flow chart generally illustrating an embodiment of a method for creating a standard-configuration workflow using a workflow designer system.

FIG. 5 is a flow chart generally illustrating an embodiment of a method 500 for creating a standard-configuration workflow using a workflow designer system. The method of creating a standard-configuration workflow may begin by the second interface 120 receiving 510 the user data input from the first interface 110. The second interface 120 may determine 520 a standard configuration for rendering the received user data input from the first interface 110. The second interface 120 may then render 530 the received user data input into the standard-configuration workflow according to the determined standard configuration. The second interface 120 may then generate 540 the rendered standard-configuration workflow onto the second designer interface.

In another embodiment, the synergetic multi-interface workflow designer system may further comprise a third designer interface, wherein the third designer interface receives the workflow generated by the second interface and its data, determines an evaluation configuration for rendering the standard-configuration workflow, renders the standard-configuration workflow into an evaluation configuration workflow according to the determined evaluation configuration, and generates the rendered evaluation configuration workflow onto the third designer interface.

Figure 6A:
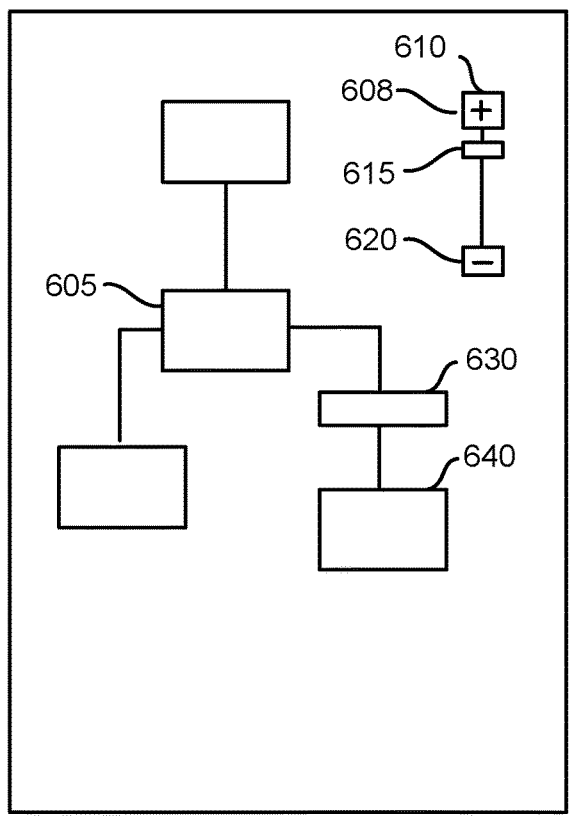
FIG. 6A is a functional block diagram generally illustrating an embodiment of the zoom out feature of a workflow designer system.

FIG. 6A is a functional block diagram generally illustrating an embodiment of the zoom out feature of a synergetic multi-interface workflow designer system. FIG. 6A illustrates a standard-configuration workflow 605 viewed on a graphical display. A zoom feature 608 for the expansion and compression of the displayed workflow may be displayed by a linear spectrum. The linear spectrum of the zoom feature 608 may comprise a plus button 610 and a minus button 620. A user may select and move a tab 615 on a line between the plus button 610 and minus button 620 to determine whether to zoom in or out of a displayed standard-configuration workflow. As the tab 615 is moved closer to the plus button 610, the standard-configuration workflow 605 may be compressed to its essential or main parts. The essential or main parts may be defined by a user or pre-selected based on the size of the high-level process or standard-configuration workflow. As the tab 615 is moved closer to the minus button 620, the standard-configuration workflow 605 may be expanded to reveal granular parts, expansion of branches, more steps, more applications, or other relationships. The user may place a cursor on a desired part of the workflow or select a desired part of the workflow via a touchscreen, and then use the zoom feature 608 to expand or compress the desire part of the workflow. FIG. 6A illustrates a preselected main step 630 of a standard-configuration workflow that is above a final step 640. The zoom feature 608 has the tab 615 closer to the plus button 610, thus compressing the main step 630.

Figure 6B:
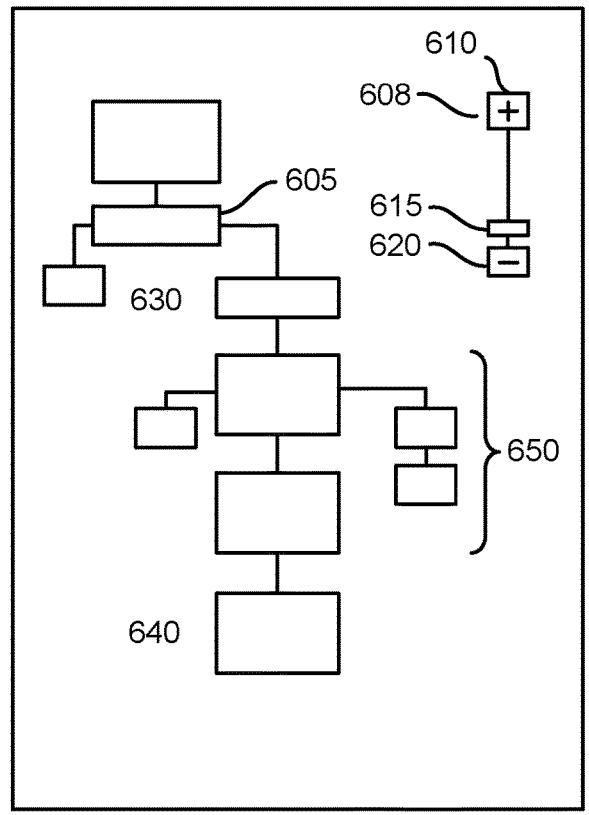
FIG. 6B is a functional block diagram generally illustrating an embodiment of the zoom in feature of a workflow designer system.

FIG. 6B is a functional block diagram generally illustrating an embodiment of the zoom in feature of a synergetic multi-interface workflow designer system. FIG. 6B illustrates a standard-configuration workflow 605 viewed on a graphical display with the tab 615 closer to the minus button 620, thus expanding the main step 630. The zoom in feature allows expansion of the main step 630, revealing additional steps and/or applications 650 between the main step 630 and the final step 640.

Figure 7A:
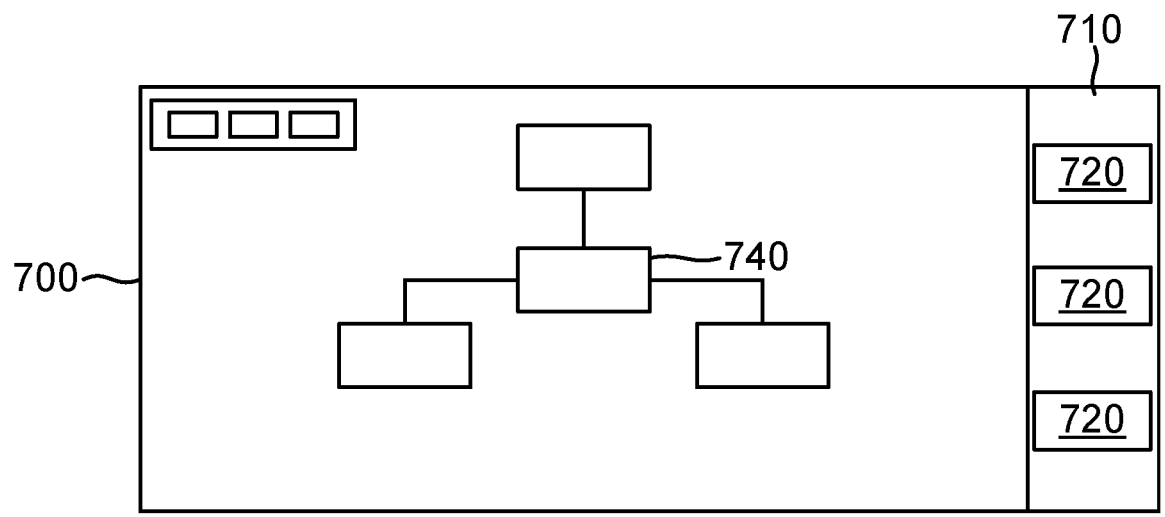
FIG. 7A is a functional block diagram generally illustrating an embodiment of the third designer interface of a workflow designer system.

FIG. 7A is a functional block diagram generally illustrating an embodiment of a third designer interface 700 of a synergetic, multi-interface workflow designer system. FIG. 7A illustrates an evaluation configuration workflow 740 viewed on a graphical display and an overlay tool menu 710, comprising one or more overlay options 720 that may be used to display data over the evaluation configuration workflow 740. Overlay features may be displayed on any of the designer interfaces and is not exclusive to any one designer interface.

Figure 7B:
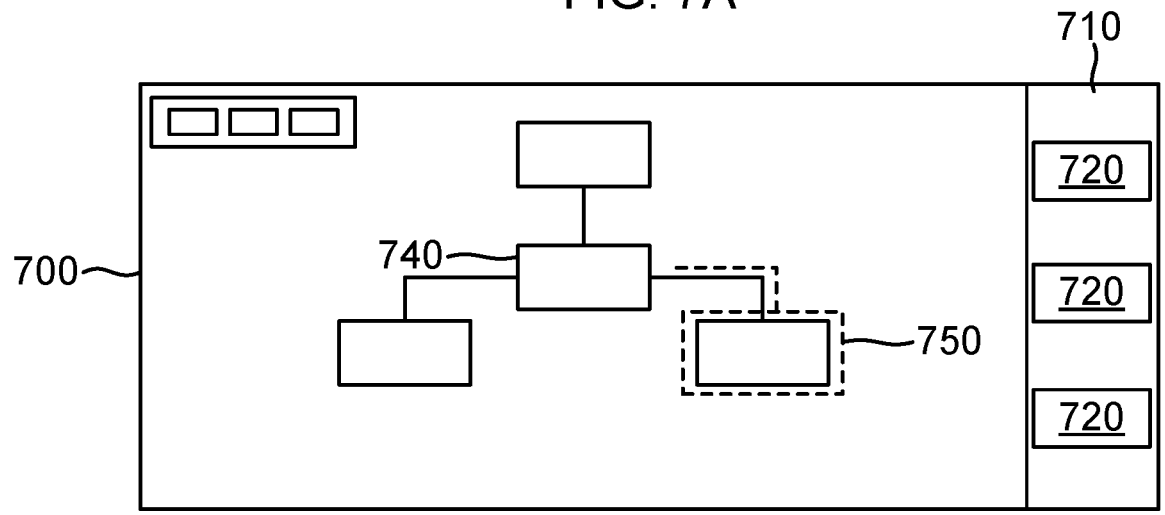
FIG. 7B is a functional block diagram generally illustrating an embodiment of an overlay feature of a third designer interface of a workflow designer system.

FIG. 7B is a functional block diagram generally illustrating an embodiment of the overlay feature of a third designer interface 700 of a synergetic, multi-interface workflow designer system. FIG. 7B illustrates an evaluation configuration workflow 740 viewed on a graphical display, and an overlay tool menu 710, comprising one or more overlay options 720 that may be used to display data over the evaluation configuration workflow 740. FIG. 7B further illustrates one embodiment of an overlay option, comprising a display 750 that demonstrates a step still required to be completed.

Figure 7C:
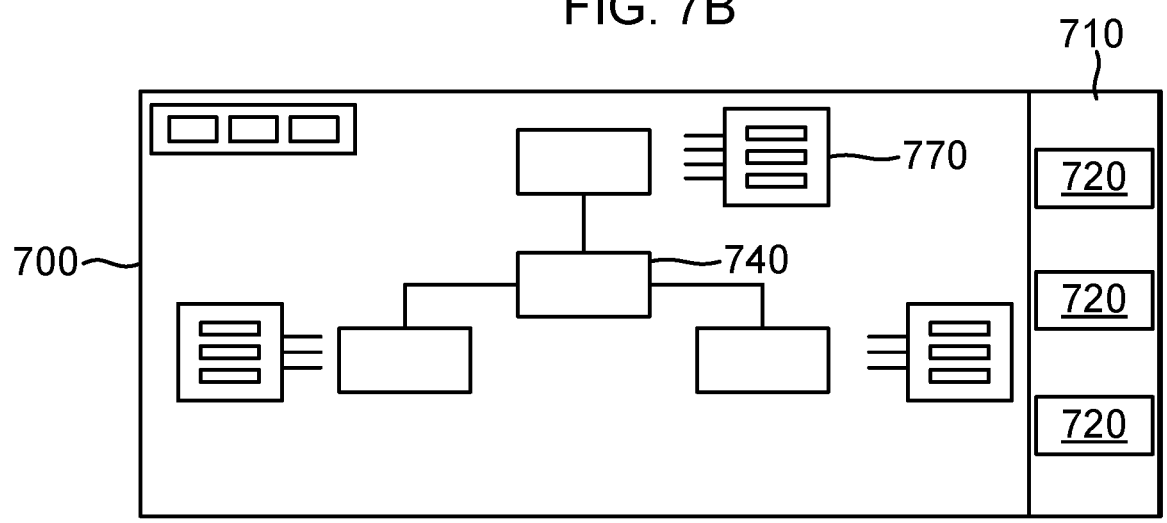
FIG. 7C is a functional block diagram generally illustrating an embodiment of an overlay feature of a third designer interface of a workflow designer system.

FIG. 7C is a functional block diagram generally illustrating an embodiment of the overlay feature of a third designer interface 700 of a synergetic, multi-interface workflow designer system. FIG. 7C illustrates an evaluation configuration workflow 740 viewed on a graphical display, and an overlay tool menu 710, comprising one or more overlay options 720 that may be used to display data over the evaluation configuration workflow 740. FIG. 7C further illustrates another embodiment of an overlay feature, comprising annotations 770 that demonstrate data for one or more of the steps. In other embodiments, overlay features may further comprise user profiles, and runtime insights such as usage, analytics, and fail points for retrospective evaluation.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprises" and variations of the word, such as "comprising" and "comprises," means "including but not limited to," and is not intended to exclude, for example, other components, integers, or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed, that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A system, comprising:
at least one designer interface and at least one processor configured to:
receive first data inputted into the at least one designer interface;
configure the received first data into a process configuration, wherein the process configuration comprises an underlying structure enabling the received data to be organized into and function as a high-level process;
display the process configuration on the at least one designer interface;
configure, based at least in part on the process configuration, the process configuration into a standard configuration for rendering a standard-configuration workflow,
wherein the standard configuration comprises an underlying structure enabling the high-level process to be organized into and function as a workflow;
render, based at least in part on the standard configuration, the standard-configuration workflow; and
display the standard-configuration workflow on the at least one designer interface.

2. The system of claim 1, wherein the at least one processor is further configured to:
receive second data inputted into the at least one designer interface, wherein the second data is associated with modifying the standard-configuration workflow;
render the second data inputted into the at least one designer interface into a modified standard-configuration workflow; and
display the modified standard-configuration workflow on the at least one designer interface.

3. The system of claim 2, wherein the at least one processor is further configured to:
determine a second process configuration for translating the received second data; and
translate the received second data into a second process configuration according to the determined second process configuration.

4. The system of claim 2, wherein the at least one processor is further configured to:
display an overlay tool menu on the at least one designer interface, wherein the overlay tool menu comprises one or more overlay options; and
display the one or more overlay options over one or more of: the standard-configuration workflow, the modified standard-configuration workflow, and the process configuration.

5. The system of claim 1, wherein the at least one designer interface comprises at least two designer interfaces.

6. The system of claim 1, wherein the high-level process comprises a map representation.

7. The system of claim 1, wherein the at least one processor is further configured to:
receive, after the process configuration is displayed and before the standard-configuration workflow is rendered, an input into the at least one designer interface associated with the displayed process configuration, wherein the configured standard configuration is based at least in part on the received input.

8. A method, comprising:
receiving first data inputted into at least one designer interface;
configuring the received first data into a process configuration, wherein the process configuration comprises an underlying structure enabling the received data to be organized into and function as a high-level process;
displaying the process configuration on the at least one designer interface;
configuring, based at least in part on the process configuration, the process configuration into a standard configuration for rendering a standard-configuration workflow,
wherein the standard configuration comprises an underlying structure enabling the high-level process to be organized into and function as a workflow;
rendering, based at least in part on the standard configuration, the standard-configuration workflow; and
displaying the standard-configuration workflow on the at least one designer interface.

9. The method of claim 8, further comprising:
receiving second data inputted into the at least one designer interface, wherein the second data is associated with modifying the standard-configuration workflow;
rendering the second data inputted into the at least one designer interface into a modified standard-configuration workflow; and
displaying the modified standard-configuration workflow on the at least one designer interface.

10. The method of claim 9, further comprising:
determining a second process configuration for translating the received second data; and
translating the received second data into a second process configuration according to the determined second process configuration.

11. The method of claim 9, further comprising:
displaying an overlay tool menu on the at least one designer interface, wherein the overlay tool menu comprises one or more overlay options; and
displaying the one or more overlay options over one or more of: the standard-configuration workflow, the modified standard-configuration workflow, and the process configuration.

12. The method of claim 9, wherein the at least one designer interface comprises at least two designer interfaces.

13. The method of claim 9, wherein the high-level process comprises a map representation.

14. The method of claim 9, further comprising:
toggling between the display of the standard-configuration workflow and the display of the process configuration.

15. A non-transitory machine-readable medium comprising instructions that when executed by a data processing device, cause the data processing device to:
receive first data inputted into at least one designer interface;
configure the received first data into a process configuration, wherein the process configuration comprises an underlying structure enabling the received data to be organized into and function as a high-level process;
display the process configuration on the at least one designer interface;
configure, based at least in part on the process configuration, the process configuration into a standard configuration for rendering a standard-configuration workflow, wherein the standard configuration comprises an underlying structure enabling the high-level process to be organized into and function as a workflow;
render, based at least in part on the standard configuration, the standard-configuration workflow; and display the standard-configuration workflow on the at least one designer interface.

16. The non-transitory machine-readable medium of claim 15, wherein the instructions that when executed by the data processing device, further cause the data processing device to:
receive second data inputted into the at least one designer interface, wherein the second data is associated with modifying the standard-configuration workflow;
render the second data inputted into the at least one designer interface into a modified standard-configuration workflow; and
display the modified standard-configuration workflow on the at least one designer interface.

17. The non-transitory machine-readable medium claim 16, wherein the instructions that when executed by the data processing device, further cause the data processing device to:
determine a second process configuration for translating the received second data; and
translate the received second data into a second process configuration according to the determined second process configuration.

18. The non-transitory machine-readable medium of claim 16, wherein the instructions that when executed by the data processing device, further cause the data processing device to:
display an overlay tool menu on the at least one designer interface, wherein the overlay tool menu comprises one or more overlay options; and
display the one or more overlay options over one or more of: the standard-configuration workflow, the modified standard-configuration workflow, and the process configuration.

19. The non-transitory machine-readable medium of claim 15, wherein the at least one designer interface comprises at least two designer interfaces.

20. The non-transitory machine-readable medium of claim 15, wherein the high-level process comprises a map representation.

* * * * *